United States Patent
Kejha

(10) Patent No.: US 11,728,509 B2
(45) Date of Patent: Aug. 15, 2023

(54) RECHARGEABLE HIGH ENERGY DENSITY MAGNESIUM / MAGNESIUM SULFIDE BATTERY

(71) Applicant: Piasecki Aircraft Corporation, Essington, PA (US)

(72) Inventor: Joseph B. Kejha, Meadowbrook, PA (US)

(73) Assignee: PIASECKI AIRCRAFT CORP., Essington, PA (US)

( * ) Notice: Subject to any disclaimer, the term of this patent is extended or adjusted under 35 U.S.C. 154(b) by 16 days.

(21) Appl. No.: 17/300,475

(22) Filed: Jul. 13, 2021

(65) Prior Publication Data
US 2023/0013240 A1    Jan. 19, 2023

(51) Int. Cl.
| | |
|---|---|
| H01M 4/00 | (2006.01) |
| H01M 10/054 | (2010.01) |
| H01M 10/0569 | (2010.01) |
| H01M 4/134 | (2010.01) |
| H01M 4/58 | (2010.01) |
| H01M 4/62 | (2006.01) |
| H01M 4/66 | (2006.01) |
| H01M 4/38 | (2006.01) |
| H01M 4/02 | (2006.01) |

(52) U.S. Cl.
CPC ......... *H01M 10/054* (2013.01); *H01M 4/134* (2013.01); *H01M 4/381* (2013.01); *H01M 4/58* (2013.01); *H01M 4/625* (2013.01); *H01M 4/661* (2013.01); *H01M 10/0569* (2013.01); *H01M 2004/027* (2013.01); *H01M 2004/028* (2013.01); *H01M 2300/0028* (2013.01)

(58) Field of Classification Search
CPC .......... H01M 4/58; H01M 4/48; H01M 4/137; H01M 10/054; H01M 4/60; H01M 4/62; H01M 10/0565
See application file for complete search history.

(56) References Cited

U.S. PATENT DOCUMENTS

| | | | |
|---|---|---|---|
| 8,354,193 B2 | 1/2013 | Muldoon | |
| 2012/0219859 A1* | 8/2012 | Doe | ........................ C01B 25/42 429/219 |

OTHER PUBLICATIONS

U.S. Appl. No. 63/103,004, filed Jul. 13, 2020 Joseph Kejha.

\* cited by examiner

*Primary Examiner* — Cynthia H Kelly
*Assistant Examiner* — Monique M Wills

(57) ABSTRACT

Novel, rechargeable magnesium/magnesium sulfide batteries are disclosed therein, having energy density competitive with lithium batteries, high cycle life, land lower cost. Production method of stabilized MgS is also described, as well as various cells' constructions.

21 Claims, 1 Drawing Sheet

RECHARGEABLE HIGH ENERGY DENSITY MAGNESIUM / MAGNESIUM SULFIDE BATTERY

This Application is continuation in part of prior Provisional Patent of Joseph B. Kejha #63/103,004 filed on Jul. 3, 2020 and entitled "Rechargeable High Energy Density Magnesium Sulfide Battery".

BACKGROUND OF THE INVENTION

Field of the Invention

This invention relates to safe rechargeable magnesium-sulfur batteries, having high energy density and long cycle life.

Description of Prior Art

It has been recognized that there is a need for low cost, safe and higher energy density batteries than present electric vehicle batteries. Elimination of the "range anxiety" in the use of electric vehicle, as well as reducing the weight, flammability and cost of the batteries are critical goals. The same requirements are for batteries in military applications. The desired range of electric vehicles should be 600 miles per one charge, approximately double of today's best electric vehicle range with 250 Wh/kg batteries. Therefore, the desired energy density of electric vehicle batteries is approximately 500 Wh/kg or more.

It is known in the art, that one promising battery chemistry to achieve this goal, is magnesium sulfur chemistry, which has high theoretical energy density, due to $-2.38$ V potential of magnesium, and having two valences. Magnesium also has higher specific capacity 2.2 Ah/g (versus graphite 0.340 Ah/g) and 3.8 Ah/cm3 volumetric capacity, (versus lithium 2.06 Ah/cm3). Sulfur has one of the highest specific capacities 1.6 Ah/g, as cathode material. Both, magnesium and sulfur are plentiful and low cost. However, magnesium sulfur chemistry has a problem in finding a compatible electrolyte with both electrodes, and suffers from sulfur dissolution into electrolytes. Some progress has been made, as can be seen in the U.S. Pat. No. 8,354,193, B2 of John Muldoon et al., but the cycle life is still short, and the cells suffer with rapid decline in capacity.

Instant invention overcomes these problems and provide safe, magnesium/magnesium sulfide batteries with high energy density of approximately 500 Wh/kg, and good cycle life at low cost.

SUMMARY OF THE INVENTION

It has now been found, that a rechargeable non-flammable, high energy density battery can be made by using magnesium (Mg) metal foil or plate, or a porous carbon as anode, and magnesium sulfide (MgS) stabilized by carbon nanotubes, or just MgS with carbon nanotubes as cathode, encased in a porous carbon structure carrier. If carbon anode is used, such battery is referred to as magnesium-ion battery.

Electrolyte in such battery is preferably non-aqueous, aprotic, sulfolane based solvent, mixed with DME and or THF, containing magnesium triflate salt or other —Mg salts, like MgPF6, which electrolyte is soaked into the cathode and into a porous electrically insulating separator between the anode and cathode, and is in contact with the magnesium or carbon anode. The electrolyte may optionally also contain a small amount of MgS and S mixtures. The cell(s) of this battery is (are) then enclosed in a moisture proof enclosure with electrical terminals exiting from the enclosure in a sealed manner. The terminals are electrically connected to the anode and cathode electrodes, and may be preferably made from nickel foil or microgrid. The porous separator may be preferably made from polytetrafluoroethylene (Gore Teflon), or polyethylene (Celgard). The cathode current collector in contact with the carbon carrier maybe of aluminum microgrid or foil. Magnesium is also much less sensitive to moisture and is less flammable, due to its higher melting point. The flammability can be also eliminated by alloying magnesium with a low percentage of calcium (Ca) (about 5%).

However, the moisture proof enclosure is necessary, due to sensitivity of MgS and Mg— salts to water. This cell can be also discharged to 0 volts without damage, and recharged again. It was also found, that this battery is very safe, since the end of life is MgS by-product, which is very stable. Magnesium also does not create dendrites, which results in high cycle life of the battery and added safety. The cell construction of this battery is preferably prismatic bi-cell, in aluminum pouch enclosure, but it can be also cylindrical, round structure, or flatly wound "prismatic" in metal can enclosures. The magnesium metal foil anode maybe also replaced by a metal current collector foil only, like Mg, Cu. Ni, or Li. In these cases, the metal foils serve as current collectors to which a nickel or copper terminal tab is electro-conductively attached. In this case the source of magnesium is MgS in the cathode, and Mg is plated onto the anode metal current collector upon charge, or may be inserted into a graphite anode if graphite is added. It should be noted, that only magnesium is cycled between the MgS cathode and the anode metal current collector, or the graphite anode. If the metal collector is lightweight lithium, or LiMg alloy, it additionally increases the energy density of the battery. The magnesium only is cycled between the electrodes, because the electrolyte contains only Mg salts. This provides for long cycle life, high capacity and safety. Lithium or magnesium current collector is preferred, but any lightweight and electrically conductive metal compatible with electrolyte for sulfur can be also used. Magnesium and sulfur are also plentiful and low cost.

Low cost MgS can be synthesized from MgO+C+S. The MgO is plentiful and cheap, since it is used in fire resistant sheetrock panels.

The liquid electrolyte provides for high rate of charge and discharge.

The principal object of the invention is to provide a rechargeable battery that has a higher energy density than present electric vehicle batteries.

A further object of the invention is to provide a rechargeable battery, which is safe.

A further object of the invention is to provide a rechargeable battery, which has a high rate of discharge and charge, and has long cycle life.

A further object of the invention is to provide a rechargeable battery, which is at low cost and is suitable for mass production.

Other objects and advantageous features will be apparent from the description and claims.

DESCRIPTION OF THE DRAWINGS

The nature and characteristic features of the invention will be more readily understood from the following description taken in connection with the accompanying drawing forming part thereof in which.

It should, of course be understood that the description and drawings herein are merely illustrative, and that various modifications and changes can be made in the structures disclosed without departing from the spirit of the invention.

DESCRIPTION OF PREFERRED EMBODIMENTS

When referring to the preferred embodiments, certain terminology will be utilized for the sake of clarity. Use of such terminology is intended to encompass not only the described embodiments, but also technical equivalents, which operate and function in substantially the same way to bring about the same result.

Figure 1:
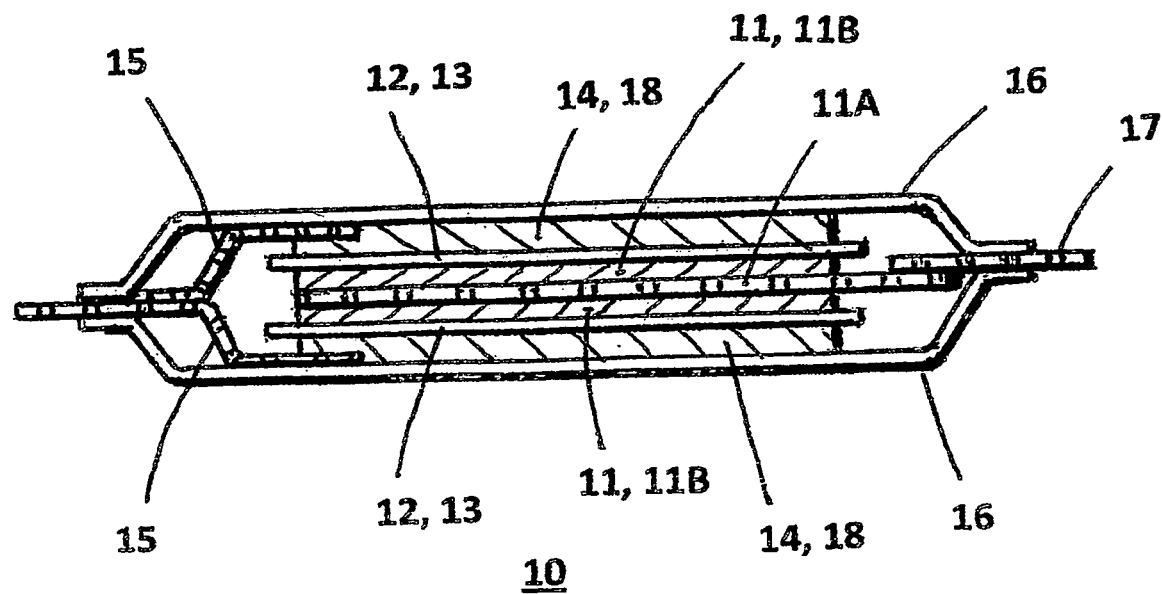
FIG. 1 is a vertical sectional view of a battery constructed in accordance with the invention.
Figure 2:
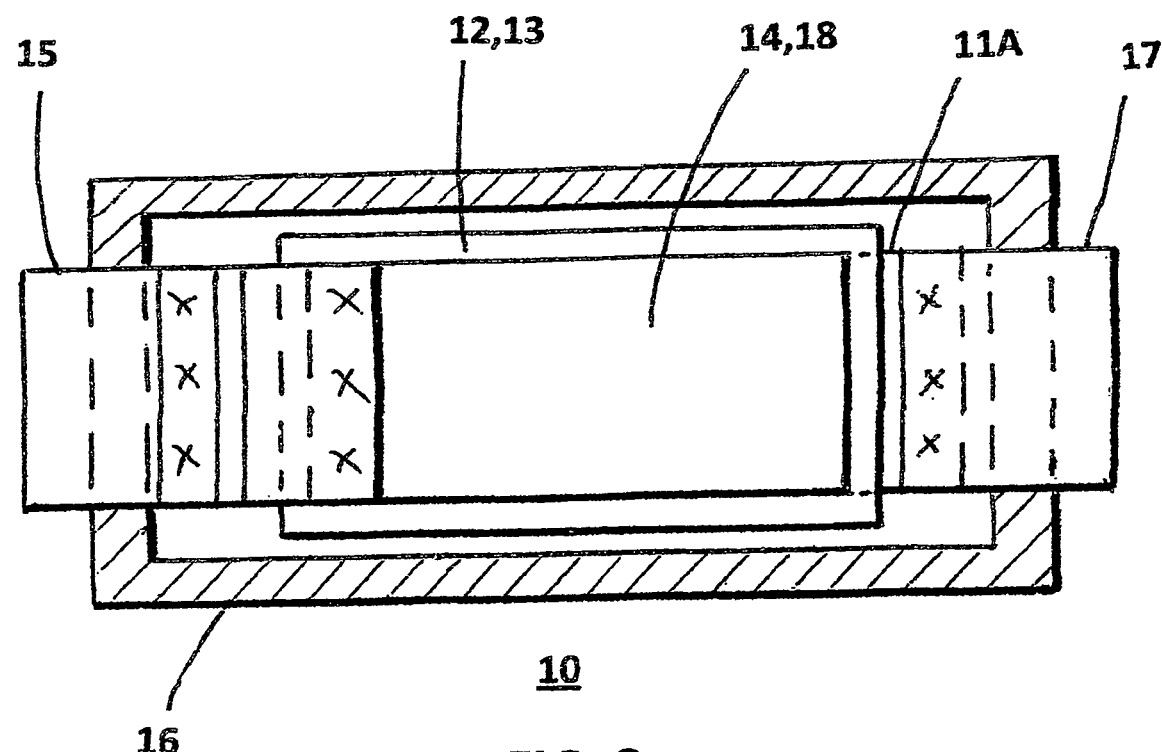
FIG. 2 is a top sectional view of a battery constructed in accordance with the invention.

Referring now to the drawings FIG. 1 and FIG. 2, a preferred rechargeable cell or battery 10 is therein illustrated, which is shown as a prismatic bi-cell. The cell 10 has a cathode 11 in the middle and comprises preferably aluminum grid or foil collector 11A coated with porous carbon particles, such as Super-P, Ketjen Black and carbon nanotubes attached or held together by a binder, preferably PEO, 400M m.w. or PVOH; and this carbon is then coated by soaking a mixture 11B of MgS (magnesium sulfide) stabilized by carbon nanotubes in preferably anhydrous solvents such as mixture of sulfolane and DME and or THF, containing also at least one Mg salt, like Mg-triflate (magnesium trifluoromethane-sulfonate) and or MgPF6 (magnesium hexafluorophosphate). Two porous insulating separators 12 are placed on both sides of the cathode 11, and soaked by the electrolyte 13 comprising at least one solvent, preferably sulfolane mixed with GBL (gamabutyrolactone) and/or DME (dimethoxyethane), and/or THF (tetrahydrofuran), and at least one magnesium salt, such as Mg-triflate, Mg-perchlorate, and Mg-hexafluorophospahte.

The high boiling point electrolyte having mixture of sulfolane and GBL is non-flammable, because the shorted cell temperature does not reach the boiling point of the electrolyte.

A small amount of MgS and S may be also added optionally into the electrolyte. The separators are preferably of PP (polypropylene), or Teflon (polytetrafluoroethylene). Two anodes 14 of magnesium foils or plates are placed on and in contact with the separators 12; and the electrolyte 13, and have preferably nickel grid tabs terminals 15 electro-conductively attached to the magnesium foils. This cell or battery is enclosed in a moisture proof enclosure 16 with terminals 15 exiting in a sealed and insulated manner. The terminals 15 are preferably full width of magnesium electrode, as shown. The cathode aluminum current collector 11A also exits from the enclosure 16 in a sealed and insulated manner, or optionally may have electrical conductively attached another full width terminal tab 17 of nickel grid of foil, exiting in sealed and insulated manner. The cell 10 maybe sealed in flexible enclosure 16 under vacuum, which provides atmospheric pressure for the outside and thus for good contacts of all components, or the enclosure is made from a tight and hard structure to hold the cells together. The anodes 14 of magnesium may be also replaced with a metal foil, serving only as a current collector 18, on which magnesium is plated during charge. The source of the magnesium is MgS in the cathode. Only magnesium is cycled during charge and discharge, due to the presence of the magnesium salt only in the electrolyte.

It should be noted, that the bi-cell shown, could be also reversed, with anode in the middle and two cathodes on the outside; or it can be a well known single cell structure (not shown). Upon assembly of the cell with magnesium anodes, the cell is discharged first.

Upon assembly of the cell with metal anode current collectors only, or with carbon anode, the cell is charged first, and then discharged. Preferred voltage span in both cases is 2.2V-1.5V. but may be up to 3.0V-1.0V. The battery or cell of the invention has double capacity over batteries with other metals, due to 2 valences of magnesium. It was also found, that these cells or batteries can be discharged many thousands of times with minimal loss of capacity, and that 500 Wh/kg can be achieved. End of the cycle life is magnesium by-product MgS, which is very stable and safe. When the cells are discharged to "0" volts, or shorted, they are still rechargeable without damage. Due to immediate availability of magnesium on the anode surface, the cells are also high rate capable.

Cathodes of the invention may be also made by replacing the sulfur (S) with magnesium sulfide (MgS), stabilized by addition of carbon nanotubes and made electrically conductive by bonding and carbonizing by heat polyacrylonitrile (PAN), or polyethylene oxide (PEO), or sugar to the MgS. (Low cost MgS is first synthesized from MgO+C+S by mixing and heating to 950C in inert atmosphere).

Resulting carbon material, loaded with MgS is useable in construction of cathode electrodes, in combination with a binder (such as PVDF or PEO) and a carbon, to provide a cathode slurry in a solvent, coated on a metal current collector, such as aluminum foil or grid, and dried.

Preparation of the stabilized cathode is as follows:
1. Powders of MgS, PAN, or PEO, or sugar, (or their mixtures), and carbon nanotubes are mixed for non-binding example only, in mass ratio 50:10:0.9.
2. This mixture is ground to create granules in a ball mill.
3. The granules are heated in a furnace in inert atmosphere for 8 hours, at approx. 450C.
4. The heat carbonizes the polymer, which binds the MgS to the carbon and nanotubes, which stabilizes the MgS.
5. The stabilized MgS is admixed into a solvent with a binder dissolved therein, and a high surface carbon is admixed to create a coating slurry.
6. The slurry is coated on a metal foil or grid electric collector, and is dried to produce stabilized porous cathode electrode. The active material (stabilized MgS) may be approx. 95% by weight.
7. This cathode is pressed by rollers to densify the coating, and is used in Mg/MgS cells. This cathode does not dissolve into the electrolytes, even when Mg is partially or fully removed from the MgS by charging.
   Said prismatic battery may be also made multi-celled, with the cells connected in parallel and sealed in a similar enclosure with terminals.
   It will thus be seen that safe, high energy density batteries with long cycle life are herein described, with which the objects of the invention are achieved.

I claim:

1. A rechargeable magnesium metal/magnesium sulfide battery comprising at least one magnesium metal anode electrode; at least one magnesium sulfide based cathode electrode; and at least one porous electrically non-conductive separator between said anodes and cathodes; and said battery is enclosed in a moisture proof enclosure with sealed and insulated electrical terminals exiting from said electrodes; and said battery is activated by a sulfolane based electrolyte with at least one magnesium based salt, in contact with said electrodes.

2. A rechargeable magnesium-ion battery comprising at least one carbon based anode electrode; at least one magnesium sulfide based cathode electrode;
and at least one porous electrically non-conductive separator between said anodes and cathodes; and said battery is enclosed in a moisture proof enclosure with sealed and insulated electrical terminals exiting from said electrodes; and said battery is activated by a sulfolane based electrolyte with at least one magnesium salt, in contact with said electrodes.

3. A rechargeable magnesium metal/magnesium sulfide battery as described in claim 1, wherein said magnesium sulfide is stabilized by carbon nanotubes, bonded to said magnesium sulfide by a carbonized polymer.

4. A rechargeable magnesium-ion battery as described in claim 2,
wherein said magnesium is stabilized by carbon nanotubes,
bonded to said magnesium sulfide by a carbonized polymer.

5. A rechargeable magnesium metal/magnesium sulfide battery as described in claim 1, wherein said magnesium sulfide is made from MgO+C+S powders mixed and heated to 950 C in an inert atmosphere.

6. A rechargeable magnesium-ion battery as described in claim 2,
wherein said magnesium sulfide is made from MgO+C+S powders mixed and heated to 950 C in an inert atmosphere.

7. A rechargeable magnesium metal/magnesium sulfide battery as described in claim 1, which is made as a prismatic bi-cell.

8. A rechargeable magnesium-ion battery as described in claim 2,
which is made as a prismatic bi-cell.

9. A rechargeable magnesium metal/magnesium sulfide battery as described in claim 1, which is made as a rolled bi-cell in a cylindrical can.

10. A rechargeable magnesium-ion battery as described in claim 2,
which is made as a rolled by-cell in a cylindrical can.

11. A method of stabilized magnesium sulfide cathode preparation as follows:
Providing MgS, PAN, PEO, sugar and carbon nanotubes powders;
Mixing together said powders;
Grinding said mixture in a ball mill to create granules;
Heating said granules in a furnace in an inert atmosphere 8 hours at 450 C, which carbonizes the polymers and binds said MgS to carbon nanotubes;
Mixing carbonized MgS into a solvent with a high surface carbon and a polymeric binder to create a slurry;
Providing a metal current collector;
Coating said slurry onto said current collector and drying said coating;
Providing a roller press;
Pressing said coating by roller press to create cathode electrodes for Mg/MgS battery.

12. A rechargeable magnesium metal/magnesium sulfide battery as described in claim 1, wherein said sulfolane based electrolyte comprising sulfolane and GBL and a magnesium based salt is non-flammable.

13. A rechargeable magnesium-ion battery as described in claim 2,
wherein said sulfolane based electrolyte comprising sulfolane and GBL and a magnesium based salt is non-flammable.

14. A rechargeable magnesium metal/magnesium sulfide battery as described in claim 1, wherein said sulfolane based electrolyte comprises a mixture of sulfolane with DME and a magnesium based salt.

15. A rechargeable magnesium-ion battery as described in claim 2,
wherein said sulfolane based electrolyte comprises a mixture of sulfolane with DME and a magnesium based salt.

16. A rechargeable magnesium metal/magnesium sulfide battery as described in claim 1, wherein said sulfolane based electrolyte comprises a mixture of sulfolane with THF and a magnesium based salt.

17. A rechargeable magnesium-ion battery as described in claim 2,
wherein said sulfolane based electrolyte comprises a mixture of sulfolane with THF and a magnesium based salt.

18. A rechargeable magnesium metal/magnesium sulfide battery as described in claim 1, which is made as a prismatic multicell.

19. A rechargeable magnesium-ion battery as described in claim 2,
which is made as a prismatic multicell.

20. A rechargeable magnesium metal/magnesium sulfide battery as described in claim 1, wherein magnesium metal anode is a magnesium plating on a metal foil current collector configured from the magnesium sulfide cathode upon charging.

21. A rechargeable magnesium metal/magnesium sulfide battery as described in claim 20, wherein said metal foil current collector is a lithium foil.

\* \* \* \* \*

UNITED STATES PATENT AND TRADEMARK OFFICE
CERTIFICATE OF CORRECTION

| | | |
|---|---|---|
| PATENT NO. | : 11,728,509 B2 | Page 1 of 1 |
| APPLICATION NO. | : 17/300475 | |
| DATED | : August 15, 2023 | |
| INVENTOR(S) | : Joseph B. Kejha | |

It is certified that error appears in the above-identified patent and that said Letters Patent is hereby corrected as shown below:

On the Title Page

After item (22) add the following item (60):
"Related U.S. Application Data
Provisional application no. 63/103,004, filed on July 13, 2020."

Signed and Sealed this
Fourth Day of June, 2024

Katherine Kelly Vidal
*Director of the United States Patent and Trademark Office*